Feb. 10, 1942. M. CARTER 2,272,901
BEATER
Filed Dec. 23, 1940 2 Sheets-Sheet 2
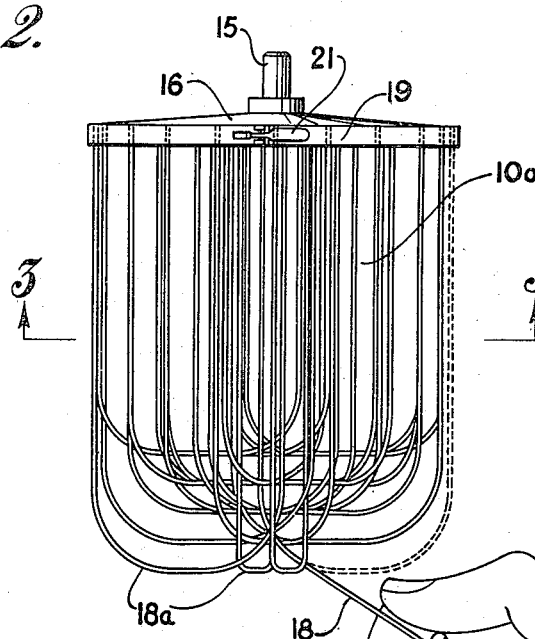
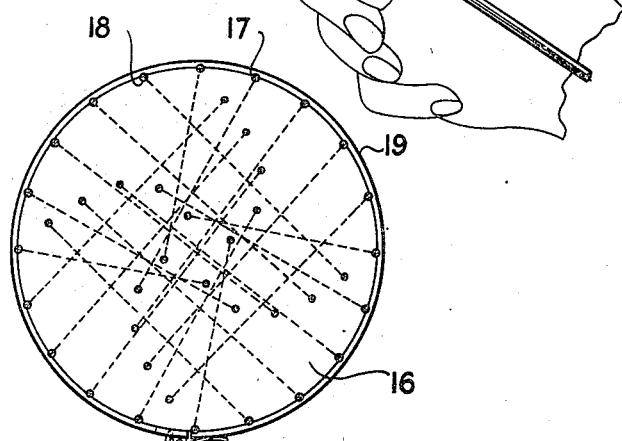
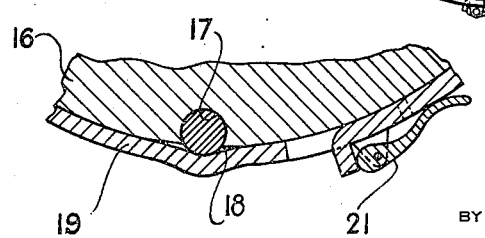
INVENTOR
Mitchell Carter
BY
ATTORNEYS Patented Feb. 10, 1942

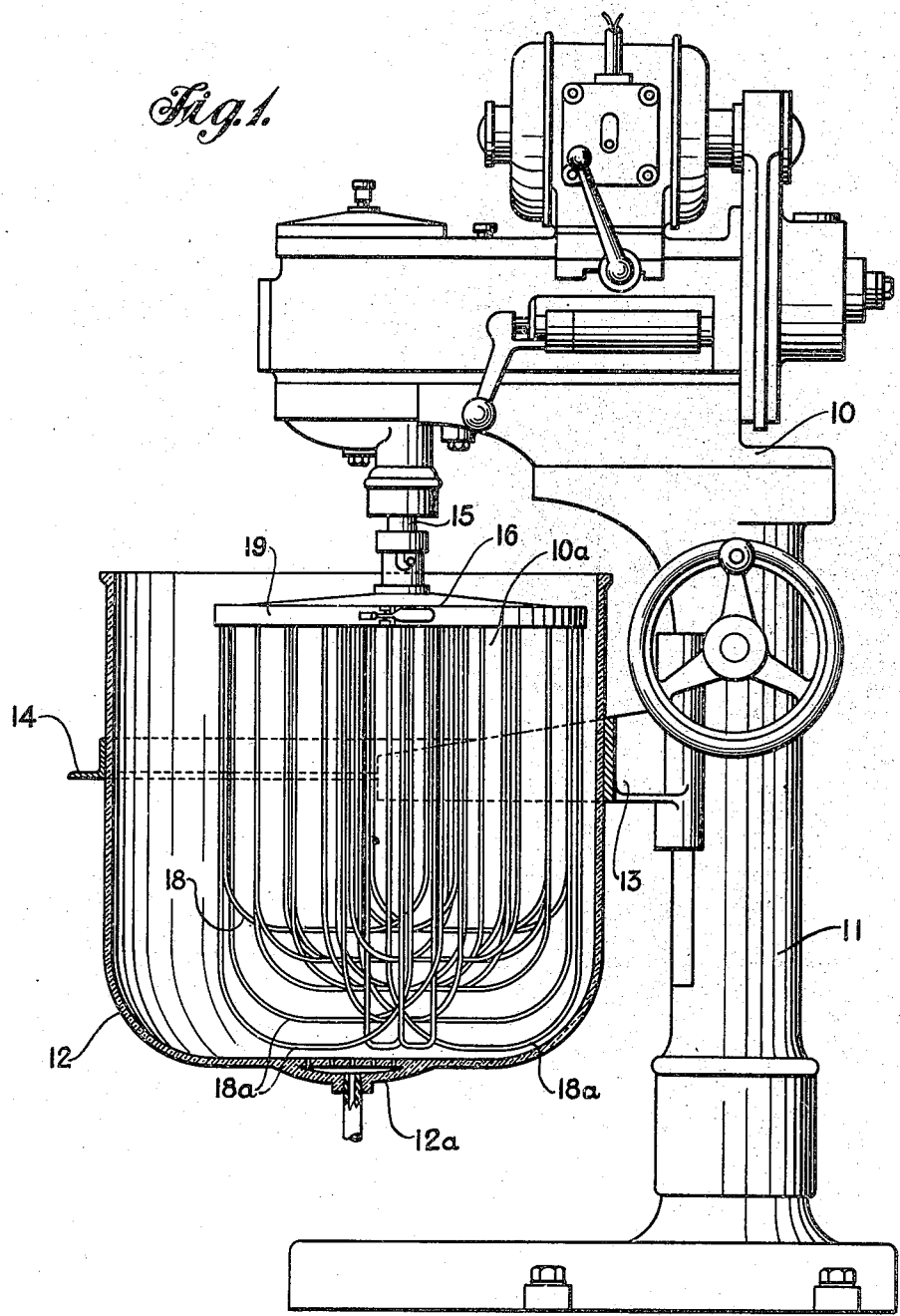

2,272,901

UNITED STATES PATENT OFFICE 2,272,901

BEATER

Mitchell Carter, Yardley, Pa., assignor to The Firestone Tire & Rubber Company, Akron, Ohio, a corporation of Ohio Application December 23, 1940, Serial No. 371,257

2 Claims. (Cl. 259—102)

This invention relates to beaters, or whipping apparatus, especially to beaters used in frothing or whipping dispersions of rubber or rubber-like substances, such as natural latex.

Heretofore various types of wire beaters, such as those used in the bakery business for whipping cream, egg whites, etc., have been used in beating or foaming latex. Such beaters are not entirely satisfactory because they are specifically designed for a different purpose. One especial problem encountered in whipping latex that does not exist, at least in the same degree, in making bread or cake, etc., is that of cleaning the blades. Since the latex foam produced usually has a gelling agent therein so that the latex rapidly sets up, or solidifies, upon the blades, it is difficult to remove therefrom. Beaters as used in other industries usually have only water soluble ingredients used therewith, so that the blades can be readily washed to clean same. Usually gelled latex foam has been cleaned from beaters by starting at each end of the wire loops forming the beater and rolling the gelled rubber film upon itself until a sufficient mass is accumulated and is positioned at a proper portion of the beater, whereby it can be cut from the beater by a knife or pair of shears.

Another difficulty encountered in previous types of latex beaters is that the wires in the beater have been attached to diametrically opposite sides of the beater framework, or supporting plate. These wire loops would all come together at the bottom of the beater, so that even with the beater being given a planetary motion in a container, various portions of the foam would not be beaten uniformly, especially the foam or latex at the bottom and the central part of the bowl.

Many attempts have been made to overcome this difficulty, but such attempts have not been successful. One proposed construction had a center shaft extending through the beater to the lower end of which various length beater blades were secured, which blades extended up to a top plate to complete the beater unit. However, latex foam, being viscous, would cling to the shaft and rotate with it without being thrown off same and hence would not be beaten, and a "dead center" would exist in the foam, particularly when a slow beating speed, which is necessary sometimes, is used.

The main object of this invention is to overcome the foregoing and other difficulties attendant upon use of the types of beater blades previously made.

A further object of the invention is to simplify the cleaning of beaters used in foaming latex.

A further object of the invention is to provide a novel beater for latex which functions to froth a mass of latex rapidly and substantially uniformly.

The above and other objects will be made apparent as the description proceeds.

In the accompanying drawings, Figure 1 is an elevation, partly in section, of apparatus embodying the invention; Figure 2 is an elevation of the beater element of the apparatus shown in Figure 1; Figure 3 is a section taken on line 3—3 of Figure 2; and Figure 4 is an enlarged detail section showing the means used to secure, removably, one end of each beater loop in the beater.

Referring specifically to the accompanying drawings, a beater apparatus indicated generally by the numeral 10 is shown. This apparatus includes a frame 11 on which suitable motor, gears, controls and the like, are carried to drive a beater unit 10a in the desired manner. An open bowl 12, having means 12a by which air can be blown into the bowl, is carried on the frame 11 by a bracket 13, which engages with an angle iron 14 secured to the bowl 12. The beater unit 10a includes a shaft 15 which is journalled in the frame 10 and driven by suitable means carried thereon, so as to be given a planetary motion with relation to the bowl 12.

A circular top, or anchor plate 16 is secured to the lower end of the shaft 15 to provide means for mounting a plurality of individual beater loops 18 forming the beater element on the shaft 15. The plate 16 has a plurality of vertically extending, substantially semi-cylindrical recesses 17 formed in the periphery thereof. The beater loops 18 are substantially U-shaped and can be formed from any suitable material, such as heavy wire, spring steel, or the like. One end of each of the loops 18 is fixedly secured to the top plate 16, with such ends of the various elements all being positioned remote from both the center and the periphery of the plate to form four substantially equal arcs, equally spaced around the circular plate, as indicated on Figure 3, with the ends of the various beater loops being positioned at different distances from the center of the plate 16. Then, to enable the loops 18 to be cleaned easily, the remaining end of each of the loops 18 is removably secured in one of the recesses 17 formed in the top plate 16 by a metal band 19, which extends around the periphery of the top plate 16, over the ends of the loops 18. The band 19 has a quickly releasably clamp lock 21 secured to the ends thereof, whereby the ends of the band can be rapidly secured together, or released to secure or remove the band 19 with relation to the plate 16. The clamp lock 21 can be loosened slightly, if desired, to slide the band 19 with relation to the top plate 16, whereby the end of the loop 18 to be cleaned can be positioned at, or immediately adjacent, the clamp lock to facilitate removing the single end of a given wire loop.

Note that certain of the wire loops 18a extend farther from the top plate 16 than other of the loops 18 and that the loops as a whole extend varying distances from the top plate so that the lower portions of the loops are separated to facilitate cleaning same. Figure 3 best shows that the wire loops 18 have portions thereof extending substantially perpendicularly to the top plate 16 at various positions intermediate to the edges thereof. This aids in preventing formation of "dead spots" when the beater is used, and helps beat or whip all latex substantially uniformly. The fact that the beater loops extend varying lengths from the top plate 16 also aids in securing this action.

Figure 4 shows that the recesses 17 comprise about three fifths of a circle, whereby one end of each wire loop must be threaded individually into a recess and the inherent spring of the loop urges the loop end outwardly against the confining portion of the plate 16. The band 19 positively positions the loop ends with relation to the plate. It will be observed that the ends of the beater loops may be hexagonal in section, or of other suitable shape, and the recesses 17 be so shaped as to require the end of the beater loop to be threaded into same. In all events, the band 19 positively secures the beater loop ends to the plate.

While the fixed ends of the beater loops 18 are shown positioned in four equally spaced arcs, such arrangement may be varied by positioning the loop ends in radial alignment, or in a different number of arcs, or in non-alignment generally as long as the loop ends are uniformly positioned around the beater.

Figure 2 best shows one method of cleaning the wire loops used in forming the beaters of the invention. That is, the removably secured end of one wire loop 18 is freed and bent downwardly slightly, whereby any gelled latex rubber thereon can be rolled up upon the beater blade and readily slid off of same to eliminate the cutting operation required in previous types of similar apparatus. Releasing one end of several of the beater loops obviously would not only simplify cleaning such loops but also facilitate the preparation of the remaining loops for cleaning since the remaining loops then are much more accessible than in previous types of beater construction.

It will be seen that the objects of the invention have been realized and that a novel type of beater has been provided.

While one embodiment of the invention has been completely illustrated and described herein, it will be appreciated that modifications thereof may be made without departing from the scope of the invention, as defined in the appended claims.

I claim:

1. A latex beater comprising a plate, a plurality of varying length substantially U-shaped loops of wire, one end of each of said loops being fixedly secured to said plate with the ends of said loops being positioned varying distances from the edge of said plate, said fixed ends of said beater loops defining arcs eccentric to each other and to the center of said plate, and means for removably securing the free ends of said loops to said top plate at the periphery thereof, said loops extending various distances from said top plate.

2. A latex beater comprising an upper plate-like member, and a plurality of wire beater loops secured to said plate-like member, one end of each of said loops being removably secured to said plate-like member adjacent the edge thereof and one end of each of said loops being fixedly secured to said plate-like member spaced from the edge thereof, the fixed ends of said loops being positioned to form four substantially evenly spaced arcs on the plate-like member, which arcs extend from adjacent the center of the plate-like member to adjacent the edge of the plate-like member, whereby said loops are distributed over the entire surface of said plate-like member.

MITCHELL CARTER.